US009432674B2

(12) United States Patent  
Garg et al.

(10) Patent No.: US 9,432,674 B2  
(45) Date of Patent: Aug. 30, 2016

(54) DUAL STAGE INTRA-PREDICTION VIDEO ENCODING SYSTEM AND METHOD

(75) Inventors: Atul Garg, Sunnyvale, CA (US); Thomas Karpati, Austin, TX (US)

(73) Assignee: NVIDIA CORPORATION, Santa Clara, CA (US)

( * ) Notice: Subject to any disclaimer, the term of this patent is extended or adjusted under 35 U.S.C. 154(b) by 1238 days.

(21) Appl. No.: 12/364,316

(22) Filed: Feb. 2, 2009

(65) Prior Publication Data

US 2010/0195730 A1    Aug. 5, 2010

(51) Int. Cl.
| H04N 11/02 | (2006.01) |
|---|---|
| H04N 19/162 | (2014.01) |
| H04N 19/176 | (2014.01) |
| H04N 19/61 | (2014.01) |
| H04N 19/107 | (2014.01) |
| H04N 19/109 | (2014.01) |

(52) U.S. Cl.
CPC .......... *H04N 19/162* (2014.11); *H04N 19/107* (2014.11); *H04N 19/109* (2014.11); *H04N 19/176* (2014.11); *H04N 19/61* (2014.11)

(58) Field of Classification Search
CPC ...................... H04N 19/00781; H04N 19/162
USPC ........................................ 375/240.01, 240.13
IPC ........................................................ H04N 11/02
See application file for complete search history.

(56) References Cited

U.S. PATENT DOCUMENTS

| 5,859,668 | A | 1/1999 | Aono et al. |
|---|---|---|---|
| 6,025,888 | A | 2/2000 | Pauls |
| 6,765,964 | B1 | 7/2004 | Conklin |
| 7,170,937 | B2 | 1/2007 | Zhou |
| 7,289,674 | B2 | 10/2007 | Karczewicz |
| 7,706,442 | B2 | 4/2010 | Kuo |
| 7,953,284 | B2 | 5/2011 | Au et al. |
| 8,059,717 | B2 | 11/2011 | Saigo et al. |
| 8,315,467 | B2 | 11/2012 | Nakamura et al. |
| 2002/0159525 | A1 | 10/2002 | Jeong |
| 2003/0158608 | A1 | 8/2003 | Ishikawa et al. |

(Continued)

FOREIGN PATENT DOCUMENTS

| JP | 2007013298 | 1/2007 |
|---|---|---|
| JP | 2008227670 | 9/2008 |

(Continued)

OTHER PUBLICATIONS

Garg, A. et al; Application as Filed; U.S. Appl. No. 12/340,442, filed Dec. 19, 2008.

*Primary Examiner* — Yulin Sun

(57) ABSTRACT

Multi-level prediction mode encoding type decision methods and systems are presented. In one embodiment, an indication of a prediction mode level is received and encoding is performed in accordance with said prediction mode level. The indication of said prediction mode level is programmable and can be set at different levels. The prediction mode level can be associated with a programmable encoding type decision point (e.g., early, intermediate, late, etc.). The encoding process includes deciding upon an I-type or P-type encoding. In one embodiment, a multi-stage encoding type method is also implemented in intra-prediction related search and inter-prediction related search and respective corresponding prediction operations are performed, wherein at least a portion of the intra-prediction related search and the inter-prediction related search are performed in parallel.

20 Claims, 10 Drawing Sheets

(56) References Cited

U.S. PATENT DOCUMENTS

| | | |
|---|---|---|
| 2003/0223645 A1 | 12/2003 | Sun et al. |
| 2003/0235249 A1 | 12/2003 | Zhao et al. |
| 2004/0028282 A1 | 2/2004 | Kato et al. |
| 2004/0114576 A1 | 6/2004 | Itoh et al. |
| 2004/0114688 A1* | 6/2004 | Kang ................. 375/240.12 |
| 2004/0184548 A1 | 9/2004 | Kerbiriou et al. |
| 2005/0089094 A1 | 4/2005 | Yoo et al. |
| 2005/0157797 A1 | 7/2005 | Gaedke |
| 2005/0249293 A1 | 11/2005 | Zeng et al. |
| 2005/0276326 A1 | 12/2005 | Drezner |
| 2006/0018385 A1 | 1/2006 | Lee |
| 2006/0126730 A1 | 6/2006 | Arakawa et al. |
| 2006/0233447 A1 | 10/2006 | Matsubara |
| 2006/0251330 A1 | 11/2006 | Toth et al. |
| 2006/0268990 A1 | 11/2006 | Lin et al. |
| 2007/0019726 A1 | 1/2007 | Cha et al. |
| 2007/0217508 A1 | 9/2007 | Shimada et al. |
| 2007/0229325 A1 | 10/2007 | Yokose et al. |
| 2008/0219350 A1* | 9/2008 | Guo et al. ............. 375/240.15 |
| 2008/0291995 A1* | 11/2008 | Graham et al. ......... 375/240.02 |
| 2009/0034856 A1 | 2/2009 | Moriya et al. |
| 2009/0154560 A1* | 6/2009 | Hong et al. ............. 375/240.15 |
| 2010/0166073 A1* | 7/2010 | Schmit et al. ........... 375/240.16 |
| 2010/0246668 A1* | 9/2010 | Rintaluoma ............. 375/240.02 |

FOREIGN PATENT DOCUMENTS

| | | |
|---|---|---|
| KR | 1020060027795 | 3/2006 |
| WO | 2004104930 | 12/2004 |

\* cited by examiner

700

An Intra-Prediction Related Search and Corresponding
Prediction are Performed Wherein at Least a Portion of
the Intra-Prediction Related Search is Performed in
Parallel with an Inter-Prediction Related Search
710

An Intra-Prediction Related Search and Corresponding
Prediction are Performed Wherein at Least a Portion of
the Inter-Prediction Related Search is Performed in
Parallel with Intra-Prediction Related Search
720

A Multi-Level Prediction Mode Encoding Type Decision
Process is Performed
730

FIG. 7

DUAL STAGE INTRA-PREDICTION VIDEO ENCODING SYSTEM AND METHOD

FIELD OF THE INVENTION

The present invention relates to the field of graphics encoding.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. Frequently, these activities involve video encoding and decoding. However, encoding and decoding can involve complicated processing that occupies valuable resources and consumes time.

The continuing spread of digital media has led to a proliferation of video content dissemination. Video content typically involves large amounts of data that are relatively costly to store and communicate. Encoding and decoding techniques are often utilized to attempt to compress the information. However, as higher compression ratios are attempted by encoding and decoding techniques, the loss of some information typically increases. If there is too much information "lost" in the compression the quality of the video presentation and user experience deteriorates.

Video compression techniques such as H.264 compression often use temporal and spatial prediction to compress raw video streams. A typical compression engine may contain an intra prediction module, a motion prediction module, a transform module, and an entropy coding module. For baseline profile 4:2:0 video, a macroblock is defined as comprising a 16×16-pixel luma block and two 8×8-pixel chroma blocks. In H.264 video coding, each macroblock can be coded as either an intra-prediction (I) macroblock, or as an inter-prediction (P) macroblock. Typically, most of the macroblocks in an encoded bitstream are P-type macroblocks, and hence, calculating the cost of the macroblock as an I-type macroblock is very costly in terms of computing resources.

SUMMARY

Multi-level prediction mode encoding type decision methods and systems are presented. In one embodiment, an indication of a prediction mode level is received and encoding is performed in accordance with said prediction mode level. The indication of said prediction mode level is programmable and can be set at different levels. The prediction mode level can be associated with a programmable encoding type decision point (e.g., early, intermediate, late, etc.). The encoding process includes deciding upon an I-type or P-type encoding. In one embodiment, a multi-stage encoding type method is also implemented in which at least a portion of the intra-prediction related search and the inter-prediction related search are performed in parallel.

DESCRIPTION OF THE DRAWINGS

The accompanying drawings, which are incorporated in and form a part of this specification, are included for exemplary illustration of the principles of the present and invention and not intended to limit the present invention to the particular implementations illustrated therein. The drawings are not to scale unless otherwise specifically indicated.

FIG. 7 is a flow chart of multi-stage encoding type method 700 in accordance with one embodiment of the present invention.

DETAILED DESCRIPTION

Figure 1:
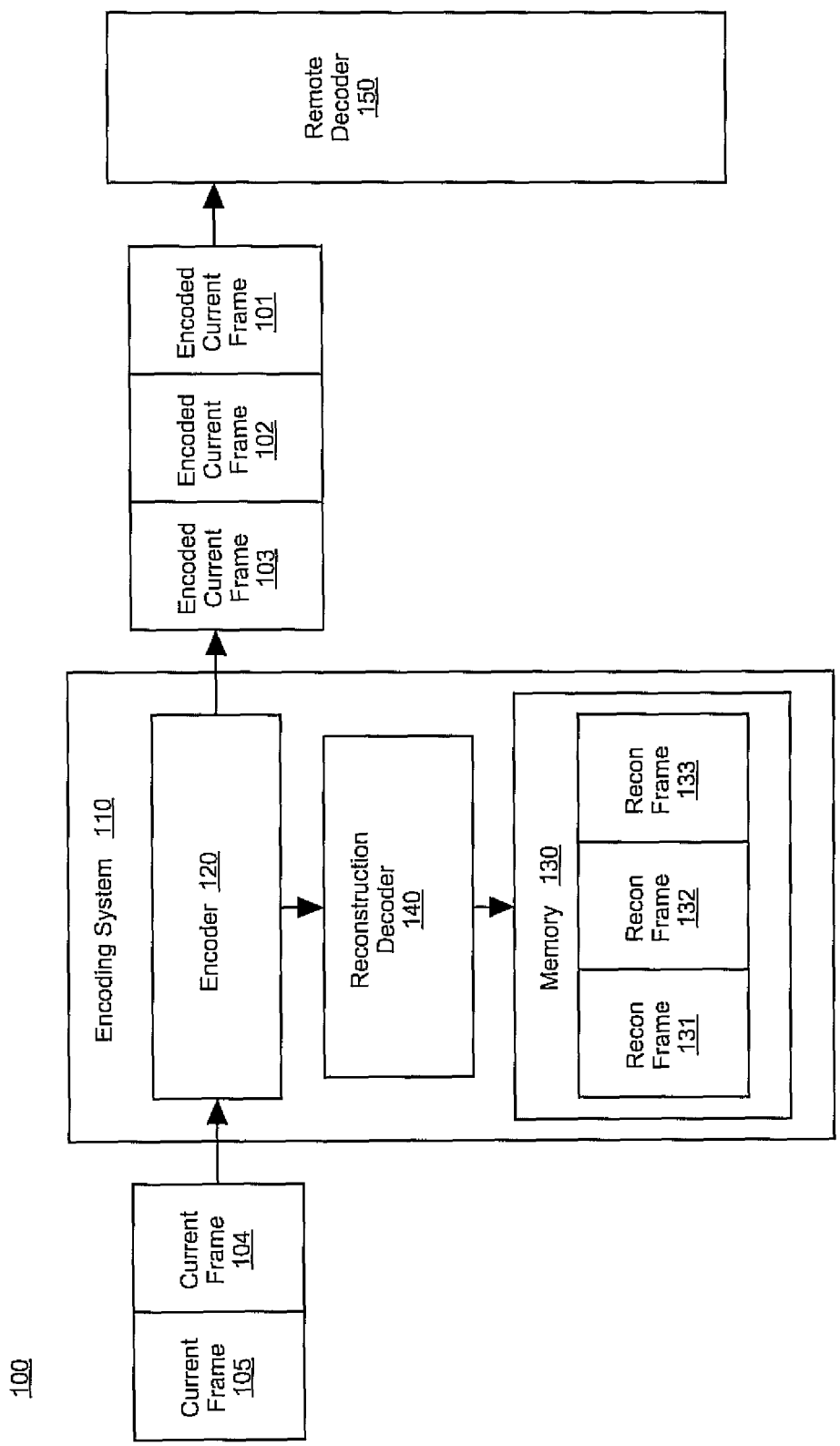
FIG. 1 is a block diagram of an exemplary encoding architecture in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" accessing," "writing," "including," "storing," "transmitting," "traversing," "associating," "identifying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

Portions of the detailed description that follows are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Although embodiments described herein may make reference to a CPU and a GPU as discrete components of a computer system, those skilled in the art will recognize that a CPU and a GPU can be integrated into a single device, and a CPU and GPU may share various resources such as instruction logic, buffers, functional units and so on; or separate resources may be provided for graphics and general-purpose operations. Accordingly, any or all of the circuits and/or functionality described herein as being associated with GPU could also be implemented in and performed by a suitably configured CPU.

Further, while embodiments described herein may make reference to a GPU, it is to be understood that the circuits and/or functionality described herein could also be implemented in other types of processors, such as general-purpose or other special-purpose coprocessors, or within a CPU.

The present invention facilitates efficient effective video compression. In one embodiment of the present invention, the decision of macroblock type is done by evaluating the cost of coding the macroblock with an I or P type prediction. The decision is made for each macroblock. Determining the cost of each I-type macroblock is relatively resource intensive and can impact performance, yet determining each macroblocks intra cost facilitates better macroblock type decisions and improves the quality of the resulting encoded bitstream. The present systems and methods facilitate a flexible and efficient balancing of quality with performance in the encoding. Present systems and methods allow programmable selection of the amount of resources that are utilize in determining prediction related costs and making a prediction type decision.

In one embodiment, intra prediction and computation is broken down into two programmable phases so that there is control over the amount of computational complexity that is expended and the quality of the final compressed bitstream. Low computational complexity can be selected and translates into more macroblocks that can be processed leading to larger frame sizes or higher frame rates, or into lower power usage to encode a fixed amount of data. Similarly, high computational complexity can be selected for applications requiring higher quality. With this flexible scheme, a fine grain control over computational complexity is possible, by setting the work done in each phase. In one exemplary implementation, some intra-predication and inter-prediction operations are initiated at the same time and performed in parallel.

FIG. 1 is a block diagram of an exemplary encoding architecture 100 in accordance with one embodiment of the present invention. Encoding architecture 100 includes encoding system 110 and remote decoder 150. Encoding system 110 receives current frames (e.g., current frames 104 and 105), encodes the current frames, and then forwards the encoded current frames (e.g., current frames 101, 102 and 103 to remote decoder 150. Encoding system 100 includes encoder 120, reconstruction decoder 140 and memory 130. The encoder 120 encodes the frames and forwards them to remote decoder 150 and reconstruction decoder 140. Reconstruction decoder 140 decodes the frames and forwards them to memory 130 for storage as reconstructed frames 131 132 and 133. In one exemplary implementation, the reconstructed frames 131, 132 and 133 correspond to current frames 101, 102 and 103.

Figure 2:
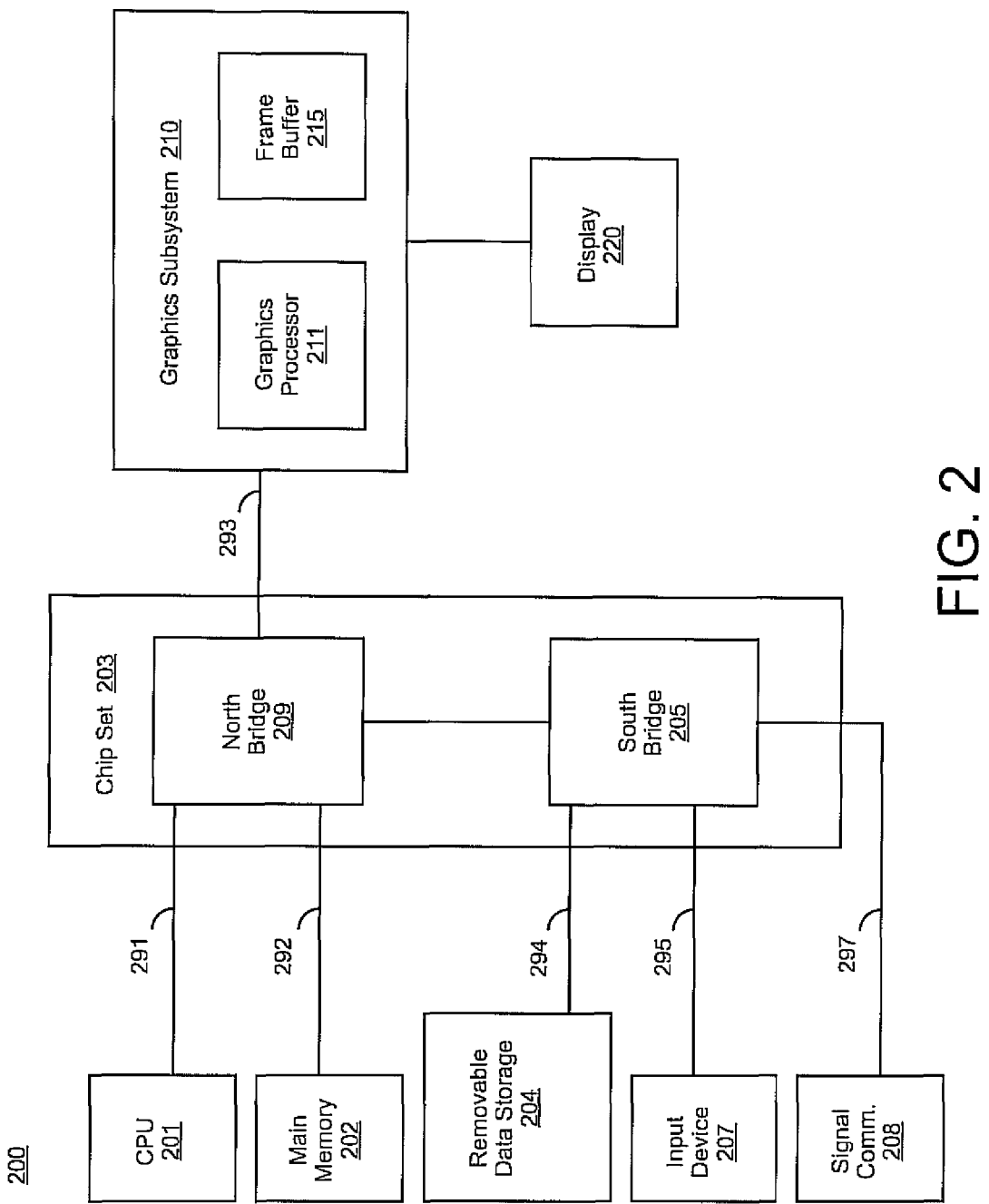
FIG. 2 is a block diagram of an exemplary computer system upon which encoding can be implemented in accordance with one embodiment of the present invention.

FIG. 2 is a block diagram of an exemplary computer system 200 is shown, one embodiment of a computer system upon which embodiments of the present invention can be implemented. Computer system 200 includes central processor unit 201, main memory 202 (e.g., random access memory), chip set 203 with north bridge 209 and south bridge 205, removable data storage device 204, input device 207, signal communications port 208, and graphics subsystem 210 which is coupled to display 220. Computer system 200 includes several busses for communicatively coupling the components of computer system 200. Communication bus 291 (e.g., a front side bus) couples north bridge 209 of chipset 203 to central processor unit 201. Communication bus 292 (e.g., a main memory bus) couples north bridge 209 of chipset 203 to main memory 202. Communication bus 293 (e.g., the Advanced Graphics Port interface) couples north bridge of chipset 203 to graphic subsystem 210. Communication buses 294, 295 and 297 (e.g., a PCI bus) couple south bridge 205 of chip set 203 to removable data storage device 204, input device 207, signal communications port 208 respectively. Graphics subsystem 210 includes graphics processor 211 and frame buffer 215.

The components of computer system 200 cooperatively operate to provide versatile functionality and performance. In one exemplary implementation, the components of computer system 200 cooperatively operate to provide predetermined types of functionality, even though some of the functional components included in computer system 200 may be defective. Communications bus 291, 292, 293, 294, 295 and 297 communicate information. Central processor 201 processes information. Main memory 202 stores information and instructions for the central processor 201. Removable data storage device 204 also stores information and instructions (e.g., functioning as a large information reservoir). Input device 207 provides a mechanism for inputting information and/or for pointing to or highlighting information on display 220. Signal communication port 208 provides a communication interface to exterior devices (e.g., an interface with a network). Display device 220 displays information in accordance with data stored in frame buffer 215. Graphics processor 211 processes graphics commands from central processor 201 and provides the resulting data to frame buffer 215 for storage and retrieval by display monitor 220.

Figure 3:
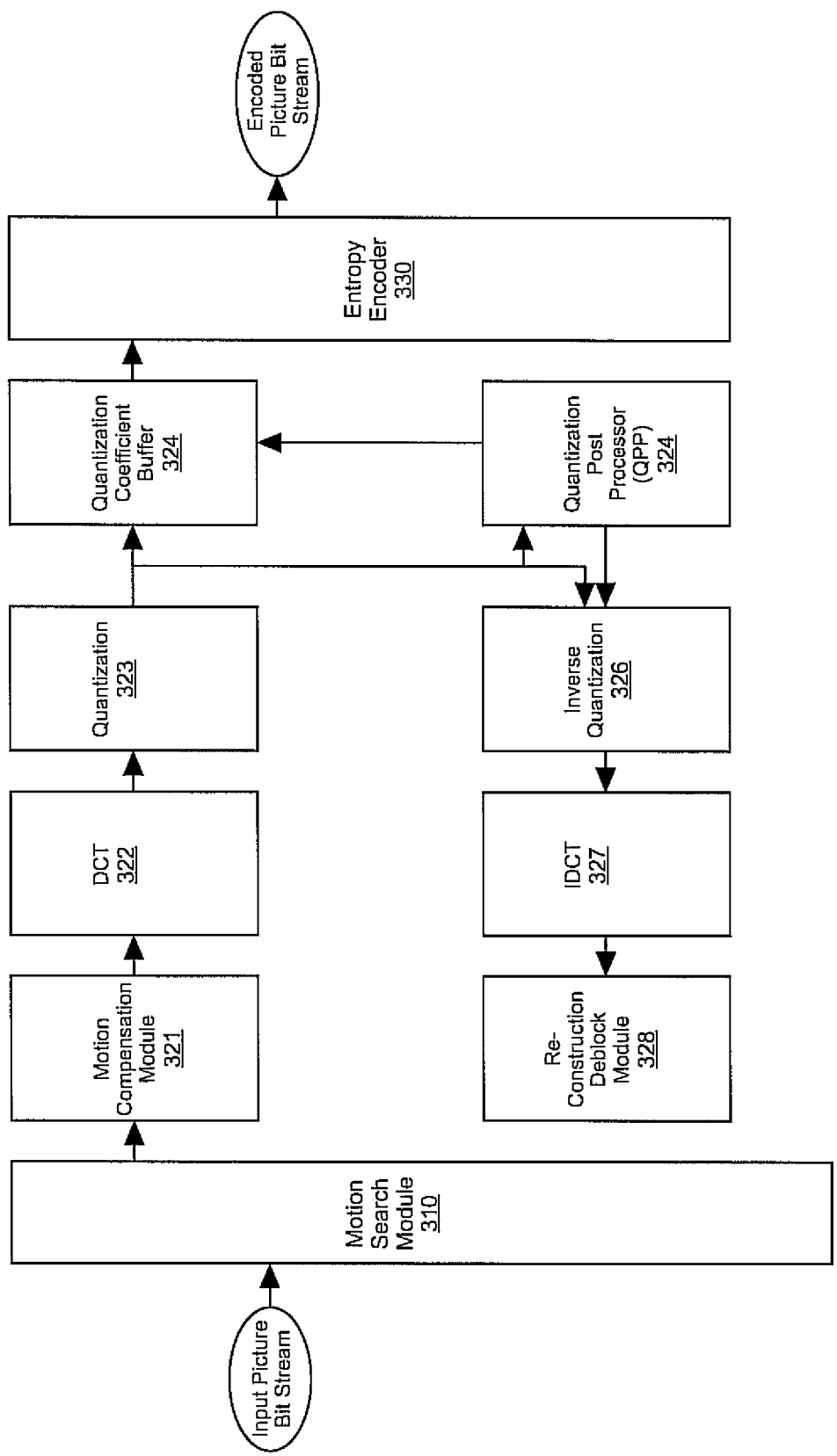
FIG. 3 is a block diagram of encoder system 300 upon which encoding can be implemented in accordance with one embodiment of the present invention.

With reference now to FIG. 3, a block diagram of quantization encoder system 300 is depicted, in accordance with one embodiment of the present invention. Quantization encoder system 300 includes motion search engine 310, motion compensation module 321, transform module 322, quantization module 323, quantization coefficient buffer module 324, inverse quantization module 324, inverse transform module 327, reconstruction/deblock module 328 and entropy encoder 330. Motion search engine 310 is communicatively coupled to reconstruction/deblock module 328 and motion compensation module 321 which is communicatively coupled to transform module 322 which in turn is communicatively coupled to quantization module 323. Quantization module 323 is communicatively coupled to quantization coefficient buffer module 324 and inverse quantization module 324 which is communicatively coupled to inverse transform module 327 which in turn is communicatively coupled to reconstruction/deblock module 328.

The components of quantization encoder system 300 cooperatively operate to facilitate increased compression ratios. Motion search module 310 receives an input bit stream of raw video data (e.g., picture data, frame data, etc.) and processes it, often in macroblocks of 16×16 pixels, and the processed information is forwarded to a motion compensation module 321. In one embodiment, the processing by motion search module 310 includes comparing the raw video data on a picture or frame by fame basis with reconstructed picture or frame data received reconstruction/deblock module 328 to detect "image motion" indications. Transform engine 322 receives motion compensated information and performs additional operations (e.g., discrete cosine transform, etc.), and outputs data (e.g., transformed coefficients, etc.) to quantization module 323. Quantization module 323 performs quantization of the received information the quantization results are forwarded to quantization coefficient buffer 324, inverse quantization module 326. Buffers, such as quantization buffer 324 can be used to buffer or temporarily store information and to increase efficiency by facilitating some independence and simultaneous operations in various encoding stages. For example, quantization coefficient buffer 324 stores results of quantization module 323. Entropy encoder 330 takes the data from quantization buffer 324, and outputs an encoded bitstream. The reconstruction pipe including inverse quantization module 326, inverse transform module 327 and reconstruction/deblock module 328 perform operations directed at creating a reconstructed bit stream associated with a frame or picture. In one embodiment, a post processing quantization is utilized to improve results. One exemplary implementation utilizes post processing quantization as described in co-pending application Ser. No. 12/340,442, entitled "Post Processing Encoding System and Method".

Figure 4:
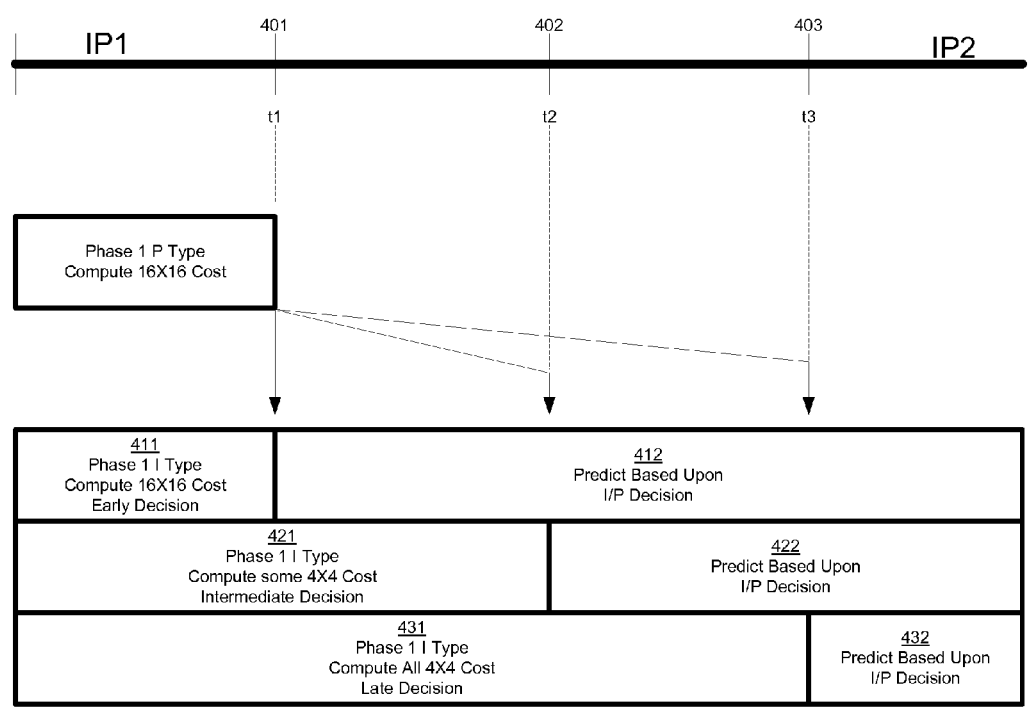
FIG. 4 is a diagram illustrating a dual phase macroblock determination and coding process in accordance with one embodiment of the present invention.

FIG. 4 is a diagram illustrating a dual phase macroblock determination and encoding process in accordance with one embodiment of the present invention. In one embodiment, various prediction mode levels are programmable. The programmability of the prediction mode level enables balancing of resource utilization and quality based upon a particular objective or application. In one exemplary implementation, a prediction mode level corresponds to an I/P decision point selection and the I/P type decision point is programmable. For example, the programmability of the decision point can allow for the I/P type decision to be made based upon preliminary data, relatively extensive data or somewhere in between. In one exemplary implementation, the I/P type decision can be made early in the process when there is preliminary data available, or the I/P type decision can be made late in the process when there is extensive data available and a relatively optimal decision may be made, or the I/P type decision can be made based upon an intermediate amount of data and somewhere in between the early and late designation. The selection of the I/P type decision point defines the boundary between a first phase and a second phase.

In one embodiment, the computations done in the first phase and second phase are dependant upon the programming of the I/P type decision point. In one exemplary implementation, the programming selection of the I/P decision point is associated with the complexity of cost determination. In one embodiment, there are three levels of cost complexity including a large macroblock cost complexity, a partial sub-macroblock cost complexity and a complete sub-macroblock cost complexity. For example, if a macroblock is a 16×16 pixel macroblock that has 4×4 pixel sub-blocks, the large macroblock cost complexity involves determining the 16×16 costs, the partial sub-macroblock cost complexity involves determining some of the 4×4 costs, and the complete sub-macroblock cost complexity involves determining all the 4×4 costs. In one exemplary implementation, the large macroblock cost complexity is considered conserving resources and utilized in an early I/P type decision, a partial sub-macroblock cost complexity is considered a mix of conserving resources and quality and is utilized in an intermediate I/P type determination and a complete sub-macroblock cost complexity is considered maximized quality and is utilized in a late determination.

The first phase can end and the second phase can begin at time t1, t2 or t3. The selection of I/P type decision point 401 corresponds to time t1, the selection of the I/P decision point 420 corresponds to time t2 and the selection of the I/P decision point 403 corresponds to time t3. In first phase operation 411, the 16×16 intra-cost is computed and an I/P decision is done based on 16×16 intra-cost and full inter-cost by decision point 401. If the macroblock mode is decided as intra, then in second phase operation 412 a further calculation is done to determine the winner between 16×16 intra and 4×4 intra modes. If the macroblock mode is decided as inter (P), then only prediction is done in the second phase operation 412. Selection of I/P type decision point 401 provides the least computational complexity for intra-cost determination.

In first phase operation 421, both 16×16 mode intra cost calculations and some of the 4×4 mode intra cost calculations are performed in the first phase by decision point 402. In one exemplary implementation of operation 421, a few 4×4 modes out of a total of nine possible modes, are computed in the first phase. Prediction is done in the second phase operation 422. In first phase operation 431, both 16×16 mode intra cost calculation and all the 4×4 mode intra cost calculation are performed by decision point 403. This in turn, means actual prediction is done in the second phase operation 432. Selection of decision point 403 involves the most computationally intensive decision. Selection of decision point 402 provides a sliding scale of flexibility in computational complexity between the two extremes of decision point 401 and 403. If the macroblock is decided as an intra, then all of the 4×4 modes are recomputed for more accuracy. Since most of the time, the macroblock type is inter (P), calculating 4×4 modes partially saves a lot of computation with little degradation in quality.

The following table shows the three decision points with the contents of first phase IP1 and second phase IP2.

| I/P decision point | IP1 | IP2 |
| --- | --- | --- |
| 1. Early I/P decision | Compute 16 × 16 intra cost | Compute 4 × 4 cost (if Intra) Predict based on I/P decision |
| 2. Intermediate I/P decision | Compute 16 × 16 intra cost Compute some 4 × 4 intra cost | Recompute all 4 × 4 costs (if Intra) Predict based on I/P decision |
| 3. Late I/P decision | Compute 16 × 16 intra cost Compute 4 × 4 intra cost | Predict based on I/P decision |

In one embodiment, inter-prediction cost determination is started when the intra-prediction cost determination is started. In one exemplary implementation, the inter-cost computation is done in full in the first phase. The first phase searches through the possible modes for prediction and computes a cost for performing I-type prediction and P-type prediction. These costs are compared to determine a macroblock mode winner as I type or P type. In one embodiment, the programmability of the decision point affects subsequent intra-cost decisions. In the second phase, if the macroblock mode is intra, more detailed analysis is done to determine a final mode winner. For example, the final macroblock intra mode could be a 4×4 or 16×16 mode. The second phase performs the actual prediction using the selected method and processes the data for use further along the processing pipeline.

The flexible selection of various prediction mode levels or adjustments in the I/P type decisions and predictions can be based upon on user programming. The user can program which intra prediction modes (e.g., 16×16, 4×4, etc.) are available in the bitstream, and the location of the I/P type decision point. In one exemplary implementation the first phase starts from the availability of 16×16 modes and proceeds towards the second phase after 16×16 calculation.

Figure 5A:
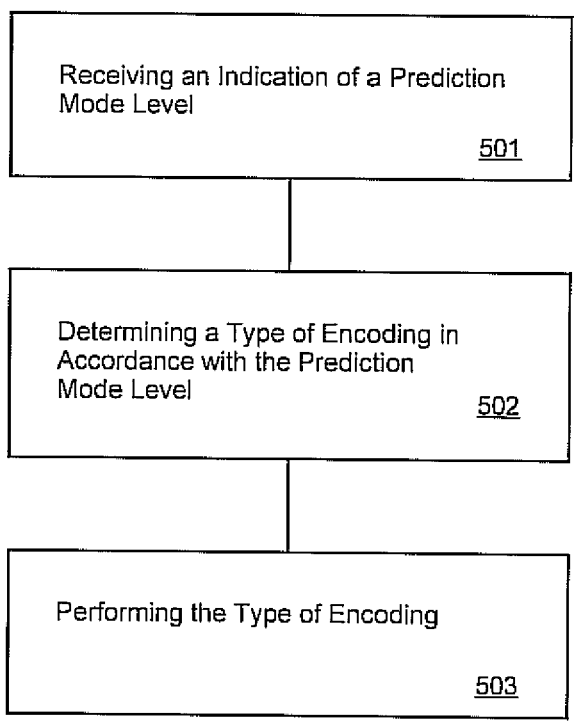
FIG. 5A is a flow chart of exemplary multi-level prediction mode encoding type decision method in accordance with one embodiment of the present invention.

FIG. 5A is a flow chart of exemplary multi-level prediction mode encoding type decision method 500 in accordance with one embodiment of the present invention.

In operation 501, an indication of a prediction mode level is received. In one embodiment, the indication of the prediction mode level is programmable. The indication of the prediction mode level can be based upon a variety of considerations, including user input, type of application, and so on. The prediction mode level can be associated with a programmable encoding type decision point. In one exemplary implementation, there are three prediction mode levels including an early prediction mode level, an intermediate prediction mode level and a late mode level.

In operation 502, a type of encoding is determined in accordance with the prediction mode level. In one embodiment, determining the type of encoding includes a flexible encoding type determination process.

At operation 503, the type of encoding determined in operation 513 is performed. In one exemplary implementation, I-type or P-type encoding is performed on received video information.

Figure 5B:
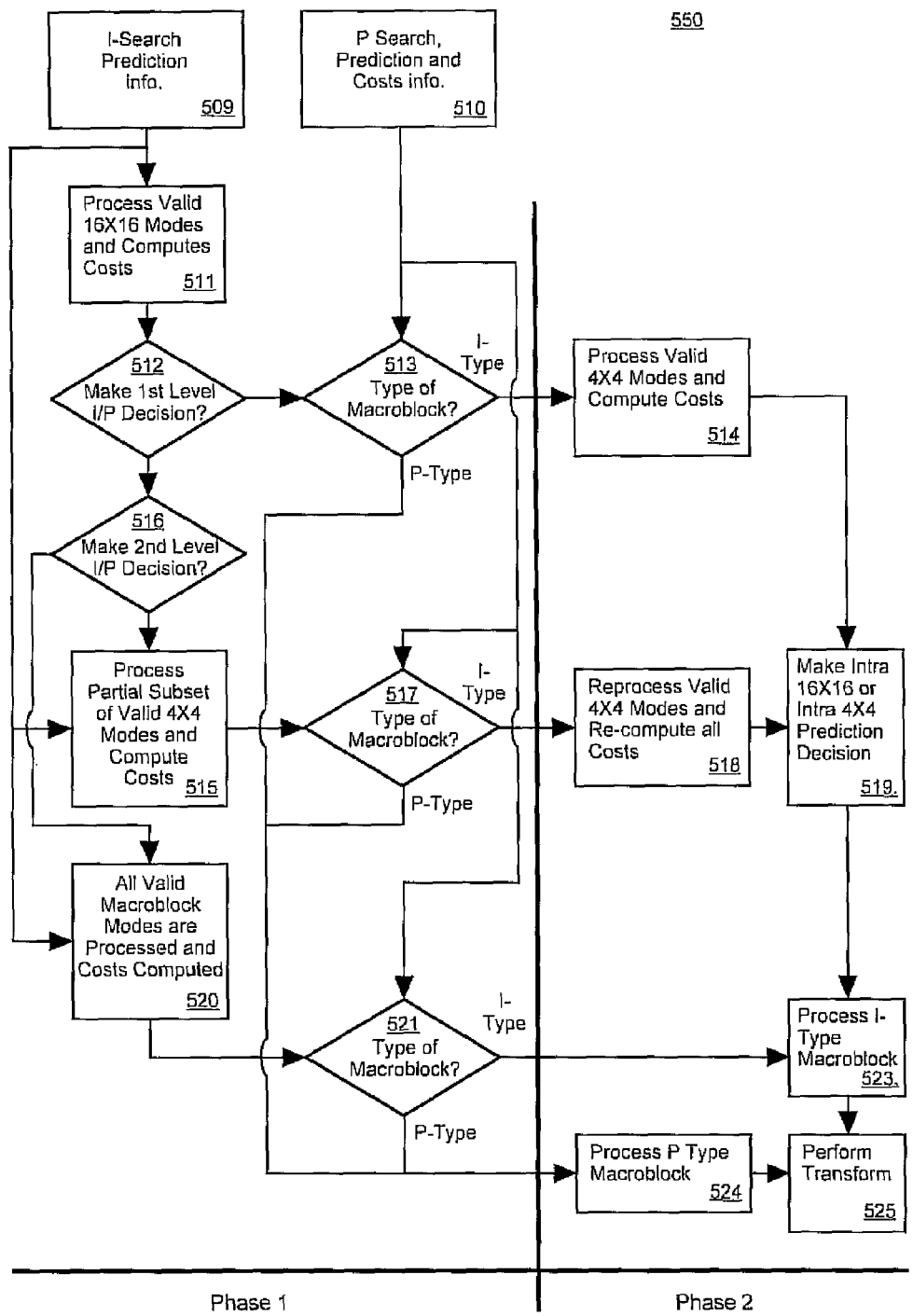
FIG. 5B is a flow chart of an exemplary flexible encoding type determination process in accordance with one embodiment of the present invention.

FIG. 5B is a flow chart of an exemplary flexible encoding type determination process 550 in accordance with one embodiment of the present invention. In one embodiment, full macroblock type prediction is a 16 pixel by 16 pixel macroblock intra-prediction type and the sub macroblock type prediction is a 4 pixel by 4 pixel sub-block intra-prediction type.

In operation 509, I-type search and prediction information is fed to operations 511, 515, and 520 and P-type search and prediction information is fed to operations 513, 517, and 521 in operation 510.

In operation 511, valid macroblock modes are processed including computing first level encoding costs. In one embodiment, the first level encoding costs correspond to large macroblock cost complexity. For example, if an application involves 16×16 macroblocks the first level encoding costs are computed for the 16×16 macroblock.

In operation 512, a determination is made if a received indication of the prediction mode level is a first level prediction mode indication. If the indication of the prediction mode level is not a first level prediction mode indication the process proceeds to operation 515. If the indication of the prediction mode level is a first level prediction mode indication the process proceeds to operation 513.

At operation 513, a decision to perform I-type encoding or P-type encoding of the macroblock is made based upon the first level encoding costs. If the decision is to perform P-type encoding the process proceeds to operation 524. If the decision is to perform I-type encoding the process proceeds to operation 514.

Processing on valid 4×4 modes is performed in operation 514, and costs are computed. When the operation 514 is complete the process jumps to operation 519.

In operation 516, a determination is made if a received indication of the prediction mode level is a second prediction mode level indication. If the indication of the prediction mode level is not a second level prediction mode indication the process proceeds to operation 520. If the indication of the prediction mode level is a second level prediction mode indication the process proceeds to operation 515.

A partial subset of the valid macroblock modes is processed at operation 515, including computing second level encoding costs. In one embodiment, the second level encoding costs correspond to intermediate macroblock cost complexity. For example, if an application involves 16×16 macroblocks and 4×4 sub-blocks, the second level encoding costs are computed for some of the 4×4 sub-blocks.

For operation 517, a decision to perform I-type encoding or P-type encoding of the macroblock is made based upon the second level encoding costs. If the decision is to perform P type encoding the process proceeds to operation 524. If the decision is to perform I type encoding the process proceeds to operation 518.

In operation 518, processing on all valid 4×4 modes is performed and all costs recomputed. The process proceeds to operation 519.

In operation 519, a determination is made whether to make a full (e.g., 16×16, etc.) macroblock type prediction or a sub (4×4, etc.) macroblock type prediction. In one embodiment, prediction information is generated again and utilized in the decision. The process jumps to operation 523.

All valid macroblock modes are processed in operation 520, including computing third level encoding costs. In one embodiment, the third level encoding costs correspond to small macroblock cost complexity. For example, if an application involves 16×16 macroblocks and 4×4 sub-blocks the third level encoding costs are recomputed for all the 4×4 sub-blocks.

In operation 521, a decision to perform I type encoding or P type encoding of the macroblock is made based upon the first level encoding costs if the received indication of the prediction mode level is a first prediction mode level indication. If the decision is to perform P type encoding the process proceeds to operation 524. If the decision is to perform I type encoding the process proceeds to operation 523.

In operation 523, I type macroblock processing is performed and in operation 524 I type macroblock processing is performed. When the respective I type macroblock or P type processing is complete the process jumps to operation 525 and a transform is performed.

Figure 6:
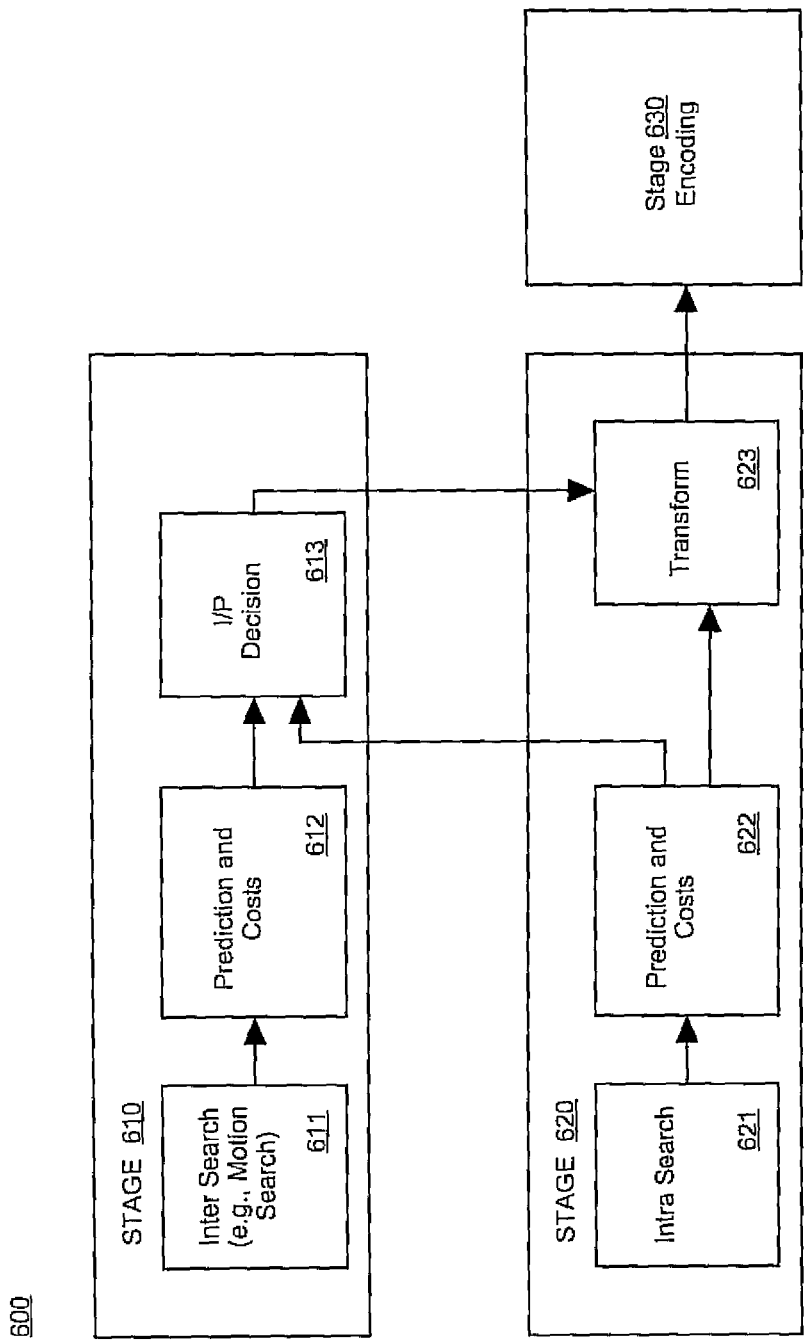
FIG. 6 is a block diagram of exemplary encoding system 600 in accordance with one embodiment of the present invention.

In one embodiment, some encoding operations can be performed in parallel. FIG. 6 is a block diagram of exemplary encoding system 600 in accordance with one embodiment of the present invention. Encoding system 600 includes first stage 610, second stage 620 and third stage 630. First stage 610 includes inter-prediction related search 611 for performing an inter-prediction related search, prediction and costs module 612 for determining inter-prediction costs, and I/P decision module 613 for deciding on inter-prediction type encoding or intra-prediction type encoding. In one exemplary implementation the inter-prediction related search is a motion search type. Second stage 620 includes intra search module 621 for performing an intra-prediction related search, prediction and costs module 622 for determining intra-prediction costs, and transform module 623 for performing a transform based upon said deciding on inter-prediction type encoding or intra-prediction type encoding. The third stage 630 performs remaining encoding operations The components of encoding system 600 cooperatively operate to perform coordinated encoding. The first stage 610 and the second stage 620 receive a video stream. Portions of operations of the first stage 610 are performed in parallel with the second stage 620. For example inter search 611 and intra search 621 begin respective operations in parallel when the video stream is received. The intra-prediction costs are communicated from the second stage 620 to the first stage 610 for utilization in the deciding on inter-prediction type encoding or intra-prediction type encoding. The results of the I/P decision are fed to the transform module 623. The transform module 623 also receives search and prediction information from stage 610 if the decision is to perform P-type encoding and receives search and prediction information from stage 620 if the decision is to perform I-type encoding.

It is appreciated encoding system 600 is readily implemented in a variety of architectures. In one embodiment the first stage and the second stage are performed in a discrete component. For example, the first stage and the second stage can be performed in a graphics processor. In one embodiment the first stage is performed in a first discrete component and the second stage is performed in a second discrete component. For example, the first stage can be performed in a central processor and the second stage can be performed in a graphics processor. Encoding system 600 can also be utilized to implement a multi-level prediction mode encoding type decision process (e.g. 500, etc.) in determining the inter-prediction costs, the intra-prediction costs and the deciding on inter-prediction type encoding or intra-prediction type encoding.

FIG. 7 is a flow chart of multi-stage encoding type method 700 in accordance with one embodiment of the present invention. In one embodiment, intra-prediction related searches and inter-prediction related searches are exhaustive searches. In addition, multi-stage encoding type method 700 can be performed based upon a decision whether to make a full macroblock type prediction or a sub macroblock type prediction.

In operation 710, an intra-prediction related search and corresponding prediction are performed wherein at least a portion of the intra-prediction related search is performed in parallel with an inter-prediction related search.

In operation 720, an inter-prediction related search and corresponding prediction are performed wherein at least a portion of the inter-prediction related search is performed in parallel with the intra-prediction related search.

In operation 730 a multi-level prediction mode encoding type decision process is performed. It is appreciated, a flexible encoding type determination process (e.g. 550, etc.) can be utilized in performing the multi-level prediction mode encoding type decision process.

Figure 8:
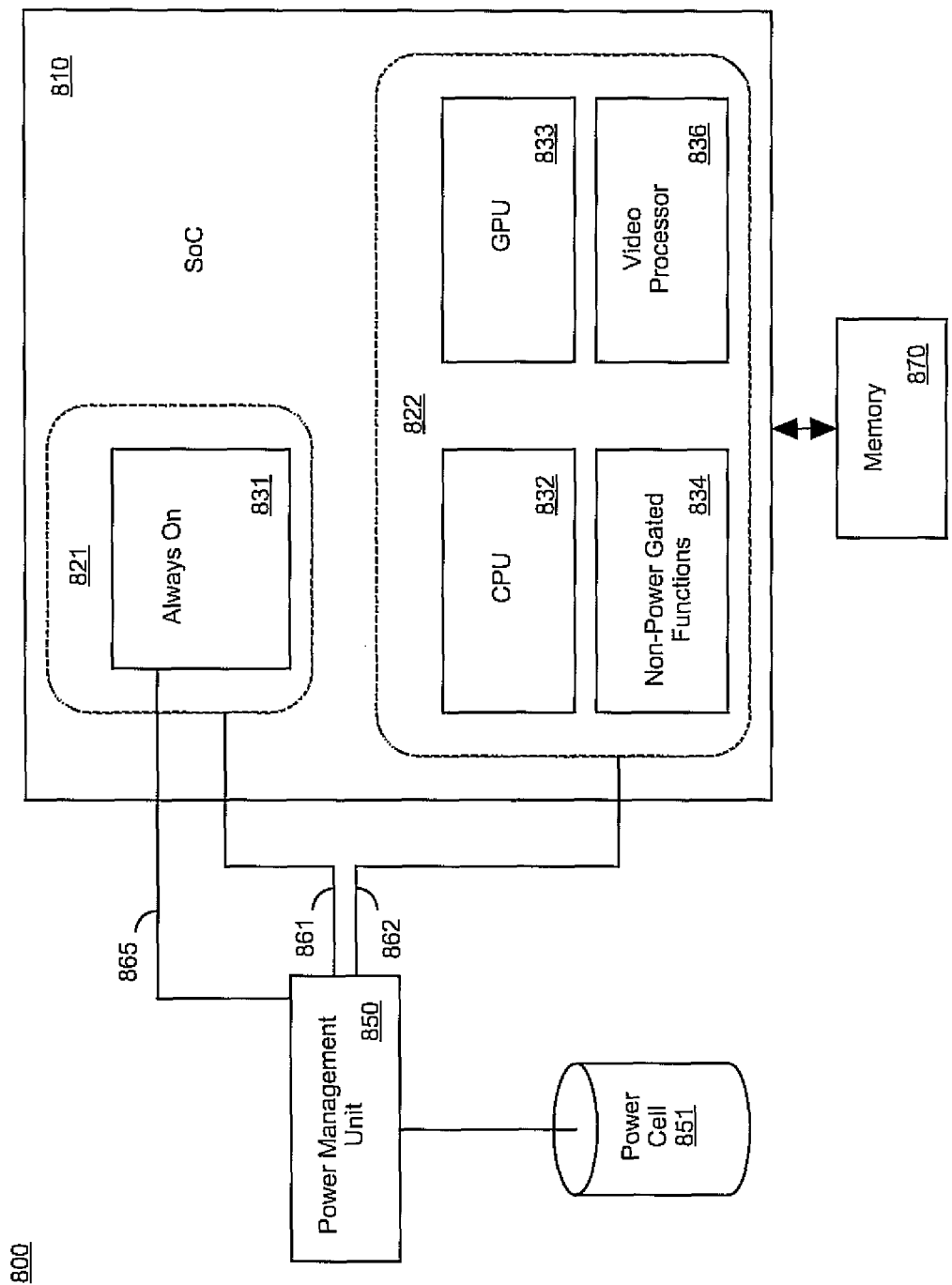
FIG. 8 shows an exemplary architecture that incorporates an exemplary video processor or graphics processor in accordance with one embodiment of the present invention.

FIG. 8 shows an exemplary architecture that incorporates an exemplary video processor or graphics processor in accordance with one embodiment of the present invention. As depicted in FIG. 8, system 800 embodies a programmable SOC integrated circuit device 810 which includes two power domains 821 and 822. The power domain 821 includes an "always on" power island 831. The power domain 822 is referred to as the core of the SOC and includes a CPU power island 832, a GPU power island 833, a non-power gated functions island 834, and an instance of the video processor. The FIG. 8 embodiment of the system architecture 800 is targeted towards the particular intended device functions of a battery-powered handheld SOC integrated circuit device. The SOC 810 is coupled to a power management unit 850, which is in turn coupled to a power cell 851 (e.g., one or more batteries). The power management unit 850 is coupled to provide power to the power domain 821 and 822 via the dedicated power rail 861 and 862, respectively. The power management unit 850 is also coupled to the power domain 821 via link 865. The power management unit 850 functions as a power supply for the SOC 810. The power management unit 850 incorporates power conditioning circuits, voltage pumping circuits, current source circuits, and the like to transfer energy from the power cell 851 into the required voltages for the rails 861-862. Programmable SOC integrated circuit device 810 is coupled to memory 870.

In the FIG. 8 embodiment, the video processor is within the domain 822. The video processor provides specialized video processing hardware for the encoding of images and video. As described above, the hardware components of the video processor are specifically optimized for performing real-time video encoding. The always on power island 831 of the domain 821 includes functionality for waking up the SOC 810 from a sleep mode. The components of the always on domain 821 will remain active, waiting for a wake-up signal. The CPU power island 832 is within the domain 822. The CPU power island 832 provides the computational hardware resources to execute the more complex software-based functionality for the SOC 810. The GPU power island 833 is also within the domain 822. The GPU power island 833 provides the graphics processor hardware functionality for executing 3-D rendering functions Domain 822 also includes video processor 836.

Figure 9:
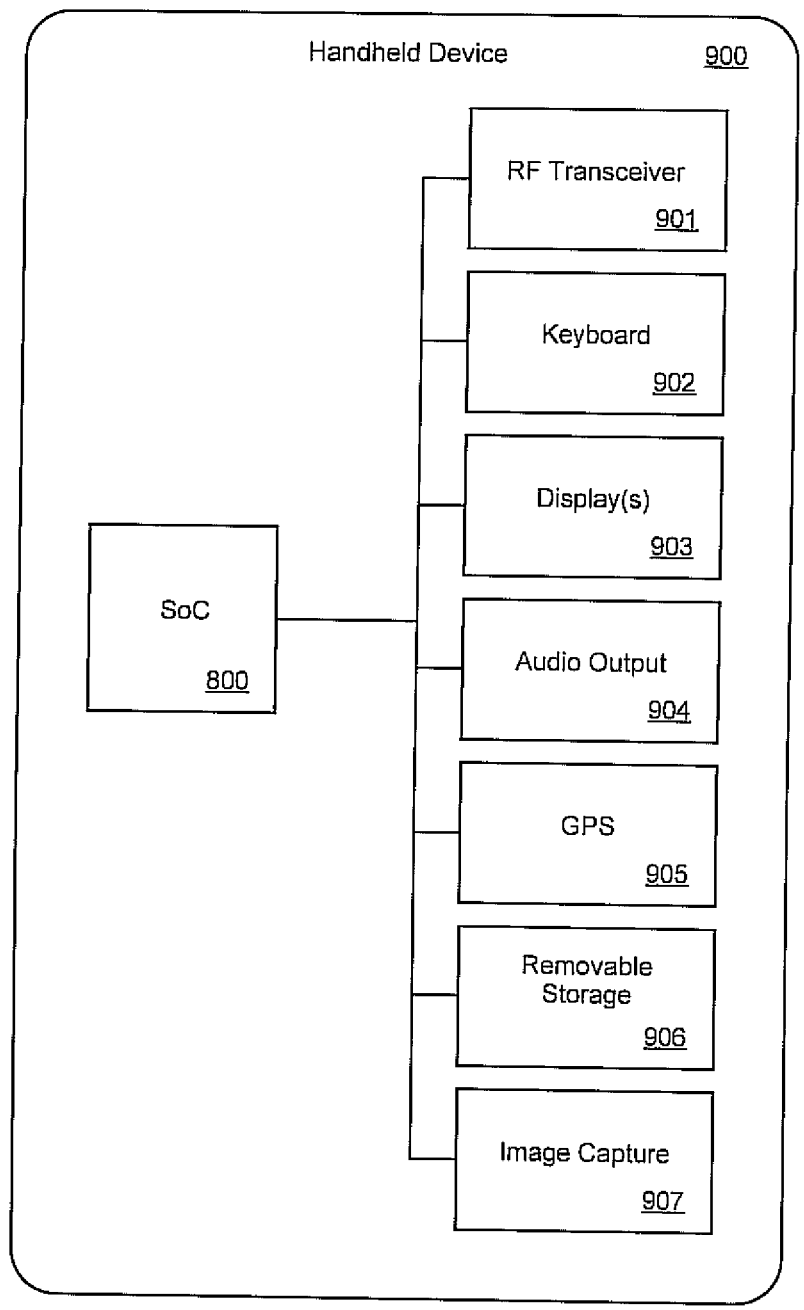
FIG. 9 shows a block diagram of exemplary components of a handheld device in accordance with one embodiment of the present invention.

FIG. 9 shows a diagram showing the components of a handheld device 900 in accordance with one embodiment of the present invention. As depicted in FIG. 9, a handheld device 900 includes the system architecture 800 described above in the discussion FIG. 8. The handheld device 900 shows peripheral devices 901-907 that add capabilities and functionality to the device 900. Although the device 900 is shown with the peripheral devices 901-907, it should be noted that there may be implementations of the device 900 that do not require all the peripheral devices 901-907. For example, in an embodiment where the display(s) 903 are touch screen displays, the keyboard 902 can be omitted. Similarly, for example, the RF transceiver can be omitted for those embodiments that do not require cell phone or WiFi capability. Furthermore, additional peripheral devices can be added to device 900 beyond the peripheral devices 901-907 shown to incorporate additional functions. For example, a hard drive or solid state mass storage device can be added for data storage, or the like.

The RF transceiver 901 enables two-way cell phone communication and RF wireless modem communication functions. The keyboard 902 is for accepting user input via button pushes, pointer manipulations, scroll wheels, jog dials, touch pads, and the like. The one or more displays 903 are for providing visual output to the user via images, graphical user interfaces, full-motion video, text, or the like. The audio output component 904 is for providing audio output to the user (e.g., audible instructions, cell phone conversation, MP3 song playback, etc.). The GPS component 905 provides GPS positioning services via received GPS signals. The GPS positioning services enable the operation of navigation applications and location applications, for example. The removable storage peripheral component 906 enables the attachment and detachment of removable storage devices such as flash memory, SD cards, smart cards, and the like. The image capture component 907 enables the capture of still images or full motion video. The handheld device 900 can be used to implement a smart phone having cellular communications technology, a personal digital assistant, a mobile video playback device, a mobile audio playback device, a navigation device, or a combined functionality device including characteristics and functionality of all of the above.

Thus, the present invention facilitates flexible and directed utilization of resources. The compression can be performed at speed in run time (e.g., in real time, etc.) with minimal stall impact on the encoding pipe operations. In addition, operations can be performed in parallel facilitating increased responsiveness and efficiency.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. The listing of steps within method claims do not imply any particular order to performing the steps, unless explicitly stated in the claim.

What is claimed is:

1. A multi-stage encoding type system comprising:
a first stage for performing an inter-prediction related search, determining inter-prediction costs and deciding on inter-prediction type encoding or intra-prediction type encoding;
a second stage for performing an intra-prediction related search, determining intra-prediction costs and performing a transform based upon said deciding on inter-prediction type encoding or intra-prediction type encoding; and
wherein said intra-prediction costs are communicated from said second stage to said first stage for utilization in said deciding on inter-prediction type encoding or intra-prediction type encoding, wherein programming selection of an intra/inter (I/P) decision point is associated with complexity of a cost determination and wherein there are three prediction mode levels including an early prediction mode level, an intermediate prediction mode level and a late prediction mode level, wherein the three prediction mode levels are associated with three different macroblock size characteristics and a change.

2. The multi-stage encoding type system of claim 1 wherein portions of operations of said first stage are performed in parallel with said second stage.

3. The multi-stage encoding type system of claim 2 wherein said first stage and said second stage receive a video stream, and said deciding on inter-prediction type encoding or intra-prediction type encoding comprises:
receiving an indication of a prediction mode level;
processing valid macroblock modes including computing first level encoding costs;
determining if said received indication of said prediction mode level is a first level prediction mode indication;
deciding to perform I-type encoding or P-type encoding of said macroblock based upon said first level encoding costs if said received indication of said prediction mode level is a first prediction mode level indication;
processing a partial subset of said valid macroblock modes including computing second level encoding costs;
determining if a said received indication of said prediction mode level is a second prediction mode level indication; and
deciding to perform I-type encoding or P-type encoding of said macroblock based upon said second level encoding costs if said received indication of said prediction mode level is a second prediction mode level indication.

4. The multi-stage encoding type system of claim 1 wherein said inter-prediction related search is a motion search type.

5. The multi-stage encoding type system of claim 1 wherein said first stage and said second stage are performed in a discrete component.

6. The multi-stage encoding type system of claim 1 wherein said first stage is performed in a first discrete component and said second stage is performed in a second discrete component.

7. The multi-stage encoding type system of claim 1 wherein a multi-level prediction mode encoding type decision process is utilized in determining said inter-prediction costs, said intra-prediction costs and said deciding on inter-prediction type encoding or intra-prediction type encoding.

8. The multi-stage encoding type system of claim 1 wherein said intra-prediction related search and said inter-prediction related search are exhaustive searches.

9. A multi-stage encoding type system comprising:
a first stage for performing an inter-prediction related search, determining inter-prediction costs and deciding on inter-prediction type encoding or intra-prediction type encoding;
a second stage for performing an intra-prediction related search, determining intra-prediction costs and performing a transform based upon said deciding on inter-prediction type encoding or intra-prediction type encoding; and
wherein said intra-prediction costs are communicated from said second stage to said first stage for utilization in said deciding on inter-prediction type encoding or intra-prediction type encoding, wherein programming selection of an intra/inter (I/P) decision point is associated with complexity of a cost determination and wherein there are three prediction mode levels including an early prediction mode level, an intermediate prediction mode level and a late prediction mode level, wherein said first stage and said second stage receive a video stream, and said deciding on inter-prediction type encoding or intra-prediction type encoding includes:
receiving an indication of a prediction mode level;
processing valid macroblock modes including computing first level encoding costs;
determining if said received indication of said prediction mode level is a first level prediction mode indication;
deciding to perform I-type encoding or P-type encoding of said macroblock based upon said first level encoding costs if said received indication of said prediction mode level is a first prediction mode level indication;
processing a partial subset of said valid macroblock modes including computing second level encoding costs;
determining if a said received indication of said prediction mode level is a second prediction mode level indication; and
deciding to perform I-type encoding or P-type encoding of said macroblock based upon said second level encoding costs if said received indication of said prediction mode level is a second prediction mode level indication.

10. The multi-stage encoding type system of claim 9 wherein portions of operations of said first stage are performed in parallel with said second stage.

11. The multi-stage encoding type system of claim 9 wherein said inter-prediction related search is a motion search type.

12. The multi-stage encoding type system of claim 9 wherein said first stage and said second stage are performed in a discrete component.

13. A multi-level prediction mode encoding type decision method comprising:
receiving an indication of a prediction mode level;
determining a type of encoding in accordance with said prediction mode level, including:
performing an inter-prediction related search in a first stage, determining inter-prediction costs and deciding on inter-prediction type encoding or intra-prediction type encoding;
performing an intra-prediction related search including a second stage, determining intra-prediction costs and performing a transform based upon said deciding on inter-prediction type encoding or intra-prediction type encoding; and wherein said intra-prediction costs are communicated from said second stage to said first stage for utilization in said deciding on inter-prediction type encoding or intra-prediction type encoding, wherein programming selection of an intra/inter (I/P) decision point is associated with complexity of a cost determination and wherein there are three prediction mode levels including an early prediction mode level, an intermediate prediction mode level and a late prediction mode level, wherein said first stage and said second stage receive a video stream, and said deciding on inter-prediction type encoding or intra-prediction type encoding includes:

receiving an indication of a prediction mode level;

processing valid macroblock modes including computing first level encoding costs;

determining if said received indication of said prediction mode level is a first level prediction mode indication;

deciding to perform I-type encoding or P-type encoding of said macroblock based upon said first level encoding costs if said received indication of said prediction mode level is a first prediction mode level indication;

processing a partial subset of said valid macroblock modes including computing second level encoding costs;

determining if a said received indication of said prediction mode level is a second prediction mode level indication; and deciding to perform I-type encoding or P-type encoding of said macroblock based upon said second level encoding costs if said received indication of said prediction mode level is a second prediction mode level indication; and performing said type of encoding.

14. The multi-level prediction mode encoding type decision method of claim 13 wherein said indication of said prediction mode level is programmable.

15. The multi-level prediction mode encoding type decision method of claim 13 wherein said indication of said prediction mode level is based upon user input.

16. The multi-level prediction mode encoding type decision method of claim 13 wherein said indication of said prediction mode level is based upon an application.

17. The multi-level prediction mode encoding type decision method of claim 13 wherein said prediction mode level is associated with a programmable encoding type decision point.

18. The multi-level prediction mode encoding type decision method of claim 13 wherein there are three prediction mode levels including an early prediction mode level, an intermediate prediction mode level and a late prediction mode level.

19. The multi-level prediction mode encoding type decision method of claim 13 further comprising determining whether to make a full macroblock type prediction or a sub macroblock type prediction.

20. The multi-level prediction mode encoding type decision method of claim 19 wherein said full macroblock type prediction is a 16 pixel by 16 pixel macroblock intra-prediction type and said sub macroblock type prediction is a 4 pixel by 4 pixel macroblock intra-prediction type.

* * * * *